(12) United States Patent
Ohta et al.

(10) Patent No.: US 11,724,903 B2
(45) Date of Patent: Aug. 15, 2023

(54) CARD PROCESSING DEVICE

(71) Applicant: NIDEC SANKYO CORPORATION, Nagano (JP)

(72) Inventors: Keiji Ohta, Nagano (JP); Satoshi Yokoyama, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 608 days.

(21) Appl. No.: 16/334,987

(22) PCT Filed: Sep. 4, 2017

(86) PCT No.: PCT/JP2017/031717
§ 371 (c)(1),
(2) Date: Mar. 20, 2019

(87) PCT Pub. No.: WO2018/061630
PCT Pub. Date: Apr. 5, 2018

(65) Prior Publication Data
US 2020/0016909 A1    Jan. 16, 2020

(30) Foreign Application Priority Data
Sep. 30, 2016    (JP) .................................. 2016-192737

(51) Int. Cl.
*B41J 13/12*    (2006.01)
*B65H 5/06*    (2006.01)
(Continued)

(52) U.S. Cl.
CPC .............. *B65H 29/125* (2013.01); *B41J 3/50* (2013.01); *B41J 11/006* (2013.01); *B41J 13/12* (2013.01);
(Continued)

(58) Field of Classification Search
CPC ....... B41J 13/12; B41J 3/60; B41J 3/50; B41J 2/325; B41J 2202/35; B65H 5/062;
(Continued)

(56) References Cited

U.S. PATENT DOCUMENTS

| 5,709,484 A | 1/1998 | Dorner |
| 5,959,278 A * | 9/1999 | Kobayashi ............... B41J 2/325 |
| | | 235/449 |
| 2010/0189489 A1* | 7/2010 | Aihara ..................... B41J 29/17 |
| | | 400/582 |

FOREIGN PATENT DOCUMENTS

| JP | 09141954 A | 6/1997 |
| JP | 2002113915 A | 4/2002 |
| JP | 2007041635 A | 2/2007 |

(Continued)

OTHER PUBLICATIONS

International Search Report corresponding to Application No. PCT/JP2017/031717; dated Nov. 7, 2017.

*Primary Examiner* — Yaovi M Ameh
*Assistant Examiner* — Quang X Nguyen
(74) *Attorney, Agent, or Firm* — Cantor Colburn LLP

(57) ABSTRACT

A card processing device may include a print unit and a card inverting unit that inverts front/rear of the card. The print unit may include a thermal head and a card conveyance mechanism. The card inverting unit may include a card holding part, a card drawing and feeding mechanism, and a rotating mechanism that rotates the card holding part. A conveyance path may be provided inside the card holding part. The conveyance path may be linear. The card drawing and feeding mechanism may include two drive rollers, and two pad rollers. A distance between a center of the drive roller and a center of the thermal head may be shorter than a length of the card. The thermal head may print on the card while the card conveyance mechanism conveys the card. The rotating mechanism may rotate the card holding part such that the conveyance path is inclined.

8 Claims, 7 Drawing Sheets

(51) Int. Cl.
*B65H 15/00* (2006.01)
*B41J 11/00* (2006.01)
*B41J 3/50* (2006.01)
*G03G 21/16* (2006.01)
*G03G 15/00* (2006.01)
*B65H 29/12* (2006.01)

(52) U.S. Cl.
CPC .......... *B65H 5/062* (2013.01); *B65H 15/016* (2020.08); *G03G 15/70* (2013.01); *G03G 21/1638* (2013.01); *G03G 21/1642* (2013.01); *B65H 2301/33224* (2013.01); *B65H 2701/1914* (2013.01)

(58) Field of Classification Search
CPC .......... B65H 15/00; B65H 2301/33224; B65H 2301/33222; B41F 23/002
See application file for complete search history.

(56) References Cited

FOREIGN PATENT DOCUMENTS

| | | |
|---|---|---|
| JP | 2014104745 A | 6/2014 |
| WO | 2012074001 A1 | 6/2012 |

* cited by examiner

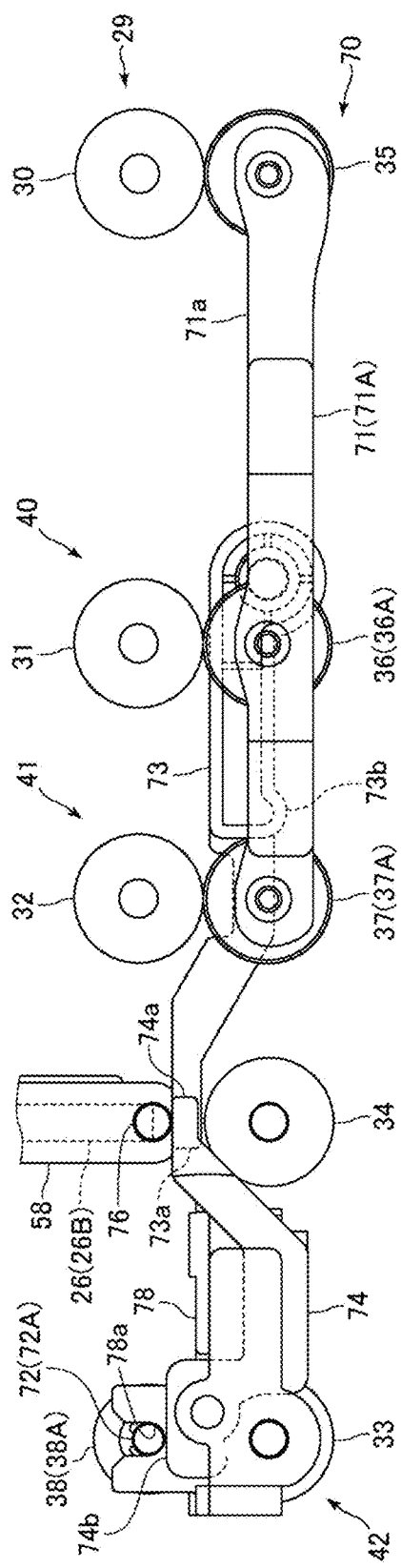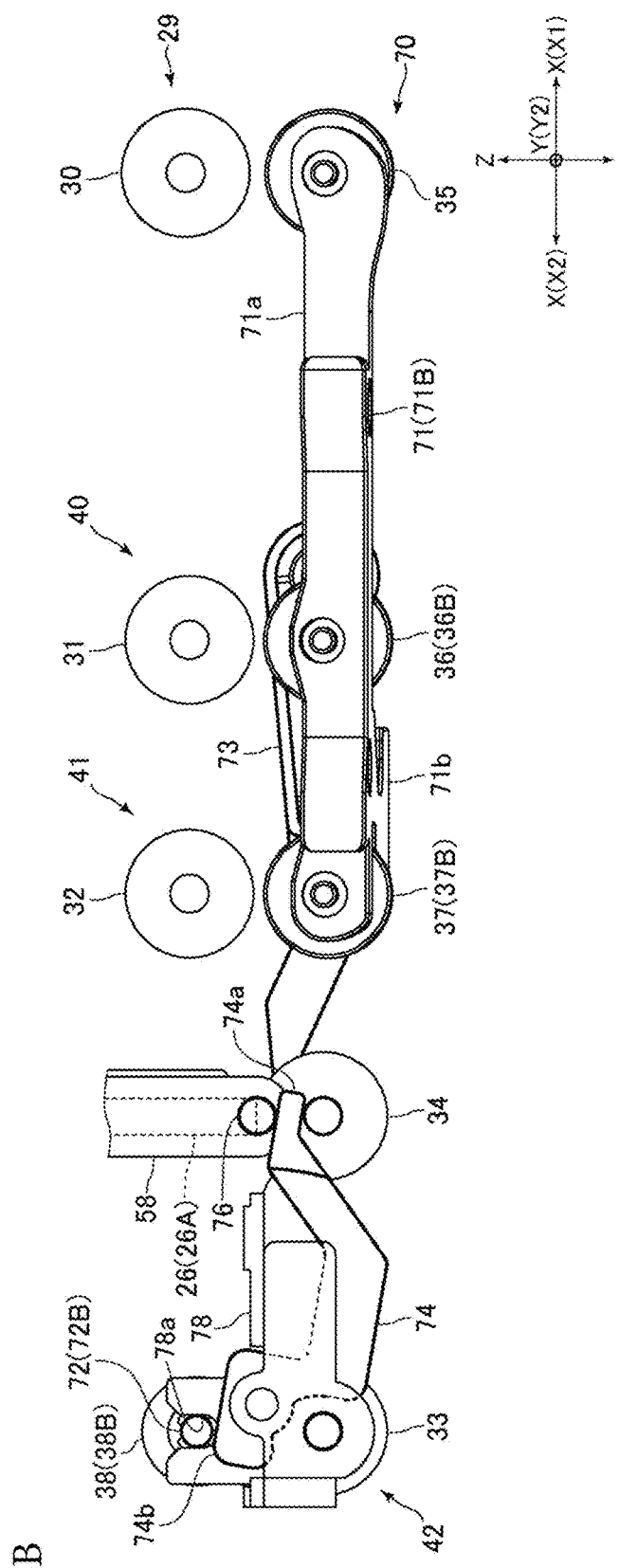

FIG. 6A
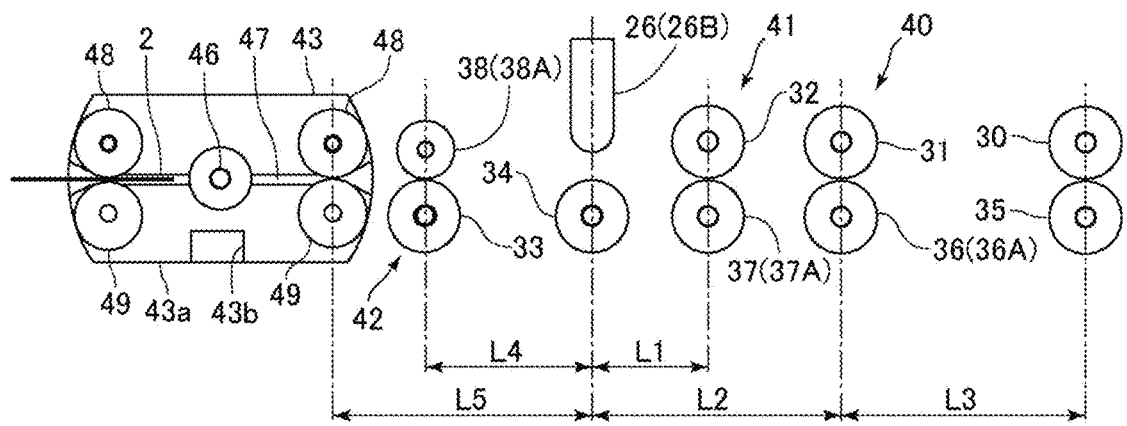
FIG. 6B
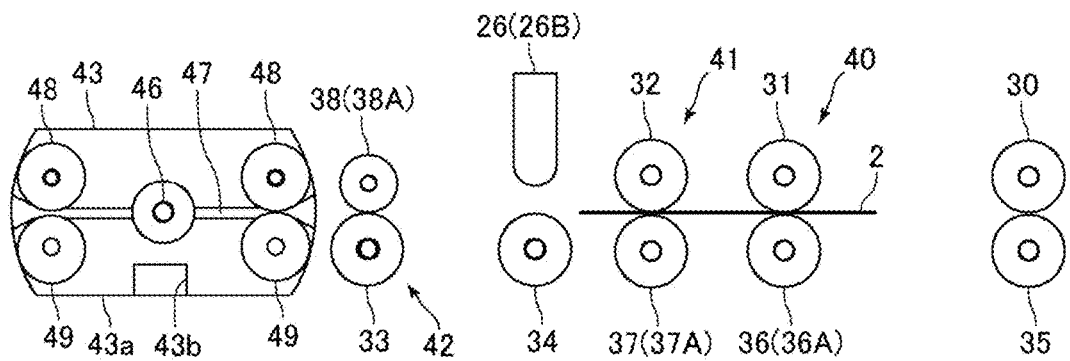
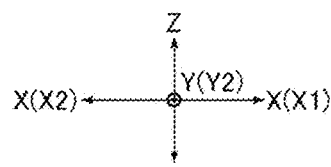

FIG. 7A
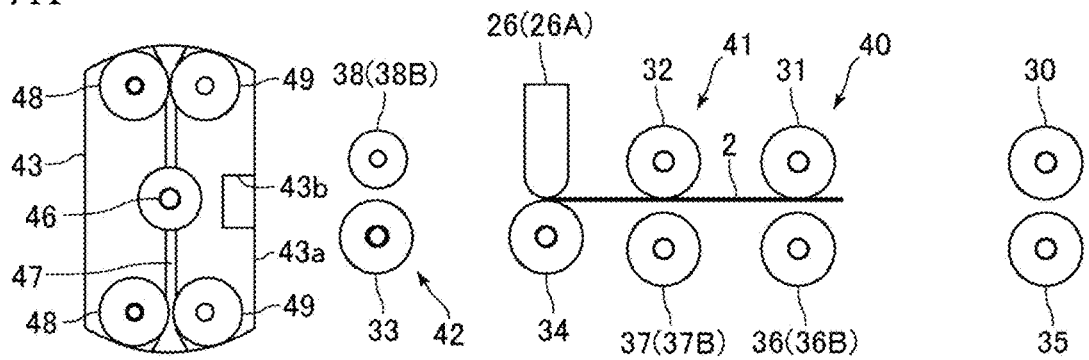
FIG. 7B
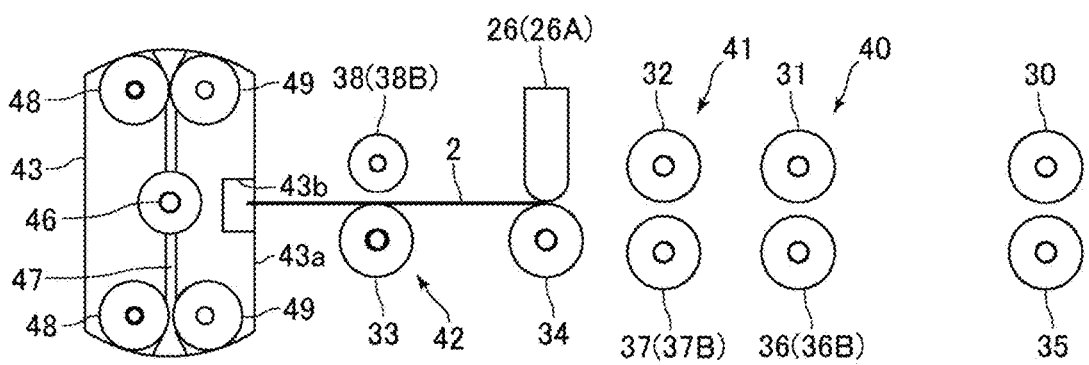
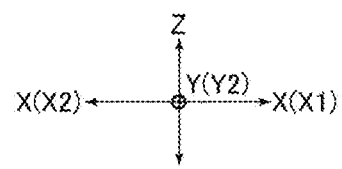

US 11,724,903 B2

CARD PROCESSING DEVICE

CROSS REFERENCE TO RELATED APPLICATIONS

This is the U.S. national stage of application No. PCT/JP2017/031717, filed on Sep. 4, 2017. Priority under 35 U.S.C. § 119(a) and 35 U.S.C. § 365(b) is claimed from Japanese Application No. 2016-192737, filed Sep. 30, 2016; the disclosures of which are incorporated herein by reference.

TECHNICAL FIELD

At least an embodiment of the present invention relates to a card processing device having a card printing function.

BACKGROUND

Printing devices that print on cards have been proposed (see, for example, Patent Literature 1). The printing device described in Patent Literature 1 is formed by an ink ribbon cartridge and a main body part in which the ink ribbon cartridge is removably mounted. This printing device includes: a card conveyance mechanism that conveys a card; a thermal head that heats an ink ribbon and transfers ink of the ink ribbon to print on the card; a platen roller disposed on the lower side of the thermal head; a head moving mechanism that moves the thermal head in an up-down direction; and a ribbon feeding mechanism that feeds the ink ribbon. The card conveyance mechanism includes a plurality of conveyance rollers and a plurality of pad rollers. Each of the pad rollers is disposed to face each of the plurality of conveyance rollers. The pad rollers are urged toward the conveyance rollers.

In the printing device described in Patent Literature 1, when printing on the card is to be performed, the thermal head is lowered to touch an upper surface of the card via the ink ribbon. At this time, the card is nipped between the thermal head and the platen roller, and the card is conveyed mainly by the platen roller. When printing on the card is not to be performed, the thermal head is raised. When the card is conveyed while not being printed, the card is conveyed mainly by the conveyance rollers and the pad rollers.

In the printing device described in Patent Literature 1, a card conveyance load when the thermal head is lowered and printing on the card is to be performed is high, whereas a card conveyance load when the thermal head is raised is not high. Further, when the thermal head is lowered and printing on the card is to be performed, the card is conveyed mainly by the platen roller. Therefore, in the printing device described in Patent Literature 1, when the thermal head is raised, card conveying force of the conveyance rollers and the pad rollers that mainly conveys the card does not necessarily have to be large. Therefore, in the printing devices of this type, urging force of the pad rollers with which the pad rollers are urged toward the conveyance rollers is typically set small. That is, in the printing devices of this type, pad pressure of the pad rollers is set low.

In the printing devices of this type, pad pressure of the pad rollers is typically set low. Therefore, even if an end portion of the card enters between the conveyance rollers and the pad rollers, or an end portion of the card falls out from between the conveyance rollers and the pad rollers when printing is performed on the card with the thermal head while the card is conveyed, an amount of change in a conveyance speed of the card is small. Therefore, in the printing devices of this type, even if an end portion of the card enters between the conveyance rollers and the pad rollers, or an end portion of the card falls out from between the conveyance rollers and the pad rollers when printing is performed on the card with the thermal head while the card is conveyed, deterioration in printing quality on the card can be prevented.

Also, as card issuing devices that issue cards, a card issuing device including a card rotating mechanism that rotates a card in a predetermined direction has been proposed (see, for example, Patent Literature 2). In the card issuing device described in Patent Literature 2, the card rotating mechanism includes: a drive roller and a driven roller that convey a card, a mounting member in which the drive roller and the driven roller are rotatably mounted, and a rotation-drive unit that rotates the mounting member. In this card rotating mechanism, front/back of the card can be inverted.

PATENT LITERATURE

[Patent Literature 1]
Japanese Unexamined Patent Application Publication No. 2014-104745
[Patent Literature 2]
Japanese Unexamined Patent Application Publication No. 2007-41635

The present inventors consider addition of a dual-sided printing function to the printing device described in Patent Literature 1. With the dual-sided printing function, printing can be performed on both sides of a card. In order to add a dual-sided printing function to the printing device described in Patent Literature 1, the printing device described in Patent Literature 1 and the card rotating mechanism described in Patent Literature 2 may be combined. However, a mere combination of the printing device described in Patent Literature 1 and the card rotating mechanism described in Patent Literature 2 may increase a size of the device after combination.

SUMMARY

Therefore, at least an embodiment of the present invention is, in a card processing device having a dual-sided printing function on a card, to provide a card processing device that is downsizable while maintaining printing quality on a card.

In order to solve the problem above, the card processing device according to at least an embodiment of the present invention includes: a print unit that prints on a card; and a card inverting unit that inverts front/rear of the card, wherein the print unit includes a thermal head that heats an ink ribbon and transfers ink of the ink ribbon to print on the card, and a card conveyance mechanism that conveys the card, when a conveyance direction of the card conveyed by the card conveyance mechanism is defined as a first direction, a thickness direction of the card conveyed by the card conveyance mechanism is defined as a second direction, a direction orthogonal to the first direction and the second direction is defined as a third direction, one side in the first direction is defined as a fourth direction side, and the other side opposite to the fourth direction side is defined as a fifth direction side, the card inverting unit includes a card holding part that temporarily holds the card therein, a card drawing and feeding mechanism that draws the card into the card holding part and feeds the card out of the card holding part, and a rotating mechanism that rotates the card holding part with the third direction being a rotational axis direction, a conveyance path along which the card is conveyed is formed inside the card holding part, the conveyance path when viewed from the third direction is linear in shape, the thermal head is disposed on the fourth direction side with respect to the card holding part, the card drawing and feeding mechanism includes two drive rollers arranged on both end sides of the conveyance path, and two pad rollers, each of the pad rollers being disposed to face each of the two drive rollers, and feeds the card on the fourth direction side in a first state in which the conveyance path is parallel to the first direction when viewed from the third direction, in the first state, a distance in the first direction between a center of the drive roller disposed on the fourth direction side and a center of the thermal head is shorter than a length in the first direction of the card conveyed by the card conveyance mechanism, in the print unit, the thermal head performs printing on the card while the card conveyance mechanism conveys the card toward the fifth direction side, and when printing is performed on the card with the thermal head, the rotating mechanism rotates the card holding part such that the conveyance path is inclined with respect to the first direction when viewed from the third direction.

The card processing device of at least an embodiment of the present invention includes the print unit that prints on a card, and a card inverting unit that inverts front/back of the card. Therefore, in at least an embodiment of the present invention, printing can be performed on both sides of a card.

Further, in at least an embodiment of the present invention, the card inverting unit includes the card holding part that temporarily holds the card therein, the card drawing and feeding mechanism that draws the card into the card holding part and feeds the card from the card holding part, and the rotating mechanism that rotates the card holding part with the third direction being the rotational axis direction. The card conveyance path formed inside the card holding part is linear in shape when viewed from the third direction, and a drive roller and a pad roller are arranged at each of both end sides of the conveyance path. The drive rollers and the pad rollers form the card drawing and feeding mechanism. Further, in at least an embodiment of the present invention, when the thermal head prints on the card while the card conveyance mechanism is conveying the card in the fifth direction, the rotating mechanism rotates the card holding part such that the conveyance path is inclined with respect to the first direction when viewed from the third direction.

Therefore, in at least an embodiment of the present invention, even if, in the first state in which the conveyance path is parallel to the first direction when viewed from the third direction, the distance in the first direction between the center of the drive roller disposed on the fourth direction side and the center of the thermal head is shorter than a length in the first direction of the card conveyed by the card conveyance mechanism, contact between the end portion of the card on the fifth direction side and the contact portion between the drive roller and the pad roller can be prevented when the thermal head prints on the card while the card conveyance mechanism conveys the card in the fifth direction.

Therefore, in at least an embodiment of the present invention, even if, in the first state, the distance in the first direction between the center of the drive roller disposed on the fourth direction side and the center of the thermal head is shorter than the length of the card in the first direction, and even if the pad pressure of the pad roller with respect to the drive roller is high in order to perform drawing of the card into the card holding part and feeding the card out of the card holding part, it is possible to prevent, during printing on the card, the end portion of the card on the fifth direction side from entering between the drive roller and the pad roller such that the end portion of the card on the fifth direction side abuts the contact portion between the drive roller and the pad roller.

As a result, in at least an embodiment of the present invention, even if the distance in the first direction between the center of the drive roller disposed on the fourth direction side in the first state and the center of the thermal head is shorter than the length in the first direction of the card, it is possible to prevent a change in the conveyance speed of the card when printing is performed on the card and to maintain printing quality of the card. That is, in at least an embodiment of the present invention, in the card processing device having a dual-sided printing function of a card, it is possible to downsize the card processing device in the first direction by shortening the distance in the first direction between the card holding part and the thermal head while maintaining the printing quality of the card.

In at least an embodiment of the present invention, the card holding part is substantially rectangular in shape when viewed from the third direction, and the conveyance path is formed parallel to a longitudinal direction of the card holding part that is substantially rectangular in shape when viewed from the third direction. With this configuration, while printing is performed on the card in which the card holding part is rotated such that the conveyance path is inclined with respect to the first direction when viewed from the third direction, it is possible to prevent an end portion on the fifth direction side of the card conveyed to the fifth direction side from being in contact with the card holding part.

In at least an embodiment of the present invention, during printing on the card, the rotating mechanism rotates the card holding part such that the conveyance path is inclined 90 degrees with respect to the first direction when viewed from the third direction. With this configuration, even if the distance in the first direction between the card holding part and the thermal head is shortened, it is possible to prevent, during printing on the card, an end on the fifth direction side of the card conveyed to the fifth direction side from being in contact with the card holding part. Therefore, it is possible to further downsize the card processing device in the first direction.

In at least an embodiment of the present invention, in the card holding part, a recessed part that prevents contact between an end on the fifth direction side of the card conveyed on the fifth direction side during printing on the card and the card holding part is formed, and when the card holding part is rotated during printing on the card, an opening of the recessed part faces the fourth direction side. With such a configuration, when the card holding part is rotated such that the conveyance path is inclined with respect to the first direction when viewed from the third direction, it is possible to prevent an end on the fifth direction side of the card from being in contact with the card holding part.

In at least an embodiment of the present invention, the card holding part is substantially rectangular in shape when viewed from the third direction, the conveyance path is formed parallel to a longitudinal direction of the card holding part that is substantially rectangular in shape when viewed from the third direction, when one surface in a transverse direction of the card holding part when viewed from the third direction is defined as a first transverse direction surface, the recessed part is formed in the first transverse direction surface, and the rotating mechanism rotates the card holding part such that the first transverse direction surface faces the fourth direction side during printing on the card. With this configuration, even if the distance in the first direction between the card holding part and the thermal head is shortened, it is possible to prevent, during printing on the card, an end portion on the fifth direction side of the card from being in contact with the card holding part. Therefore, it is possible to further downsize the card processing device in the first direction.

In at least an embodiment of the present invention, when a direction orthogonal to a direction in which the conveyance path is formed when viewed from the third direction is defined as an orthogonal direction, the drive rollers are disposed to face the conveyance path from one side in the orthogonal direction, the pad rollers are disposed to face the conveyance path from the other side in the orthogonal direction, and the recessed part is formed on the other side in the orthogonal direction with respect to the conveyance path. With this configuration, in the card holding part, since the power transmission mechanism that transmits power of a driving source to the drive rollers is disposed on one side in the orthogonal direction with respect to the conveyance path, the recessed part to be formed on the other side in the orthogonal direction with respect to the conveyance path is easily formed.

In at least an embodiment of the present invention, for example, the recessed part is formed between the two pad rollers in a direction in which the conveyance path is formed when viewed from the third direction.

As described above, in at least an embodiment of the present invention, in a card processing device having a dual-sided printing function of a card, it is possible to downsize the card processing device while maintaining the printing quality of the card.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 is a diagram illustrating a configuration of a roller retraction mechanism illustrated in FIG. 3 viewed from one side of a third direction.

FIG. 6 is a schematic diagram illustrating an operation of the card processing device illustrated in FIG. 1 during printing when a card is to be issued.

FIG. 7 is a schematic diagram illustrating an operation of the card processing device illustrated in FIG. 1 during printing when a card is to be issued.

DETAILED DESCRIPTION

Below, at least an embodiment of the present invention will be described with reference to the drawings.

(Entire Configuration of Card Processing Device)

Figure 1:
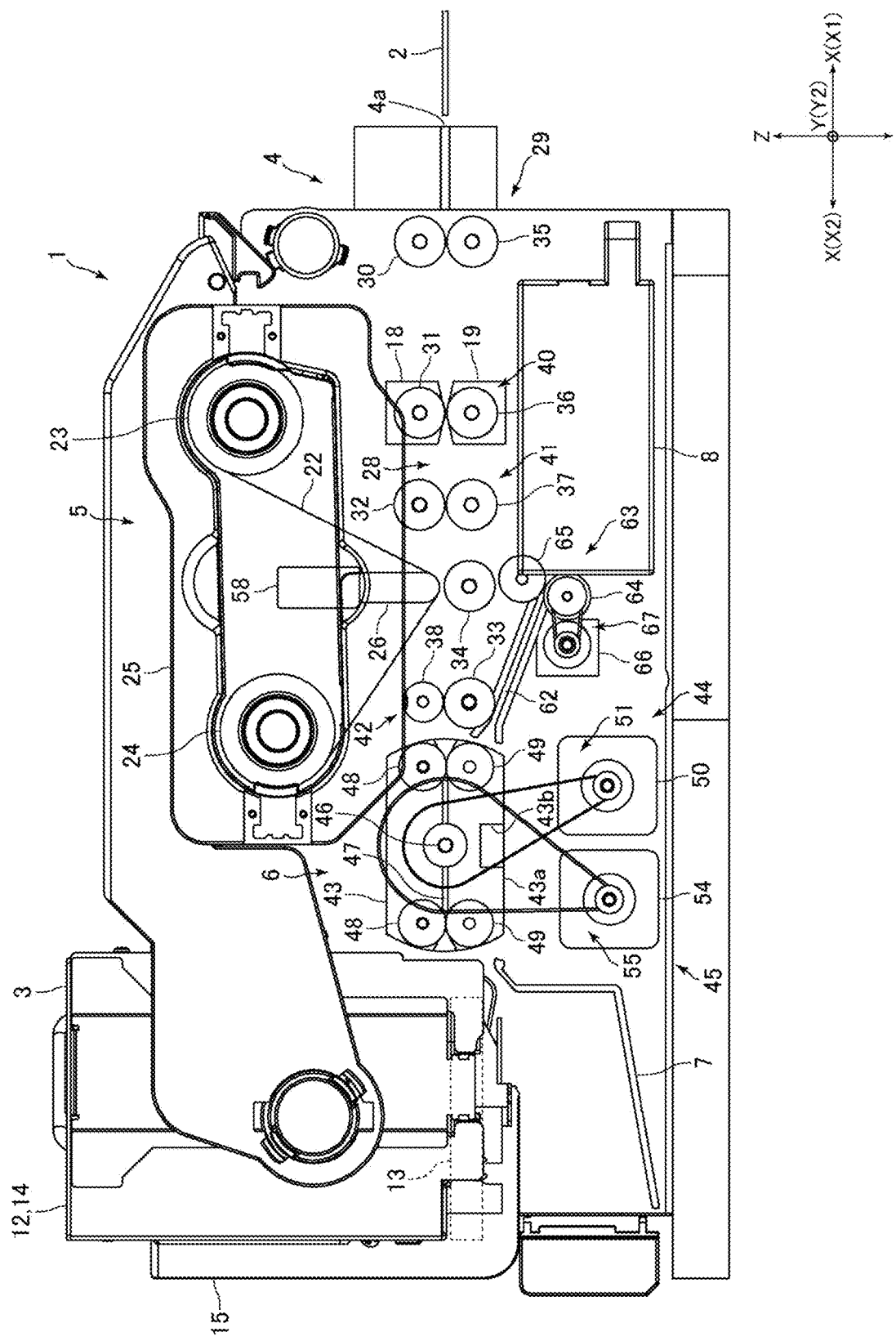
FIG. 1 is a diagram illustrating a schematic configuration of a card processing device according to an embodiment of the present invention viewed from one side.
Figure 2:
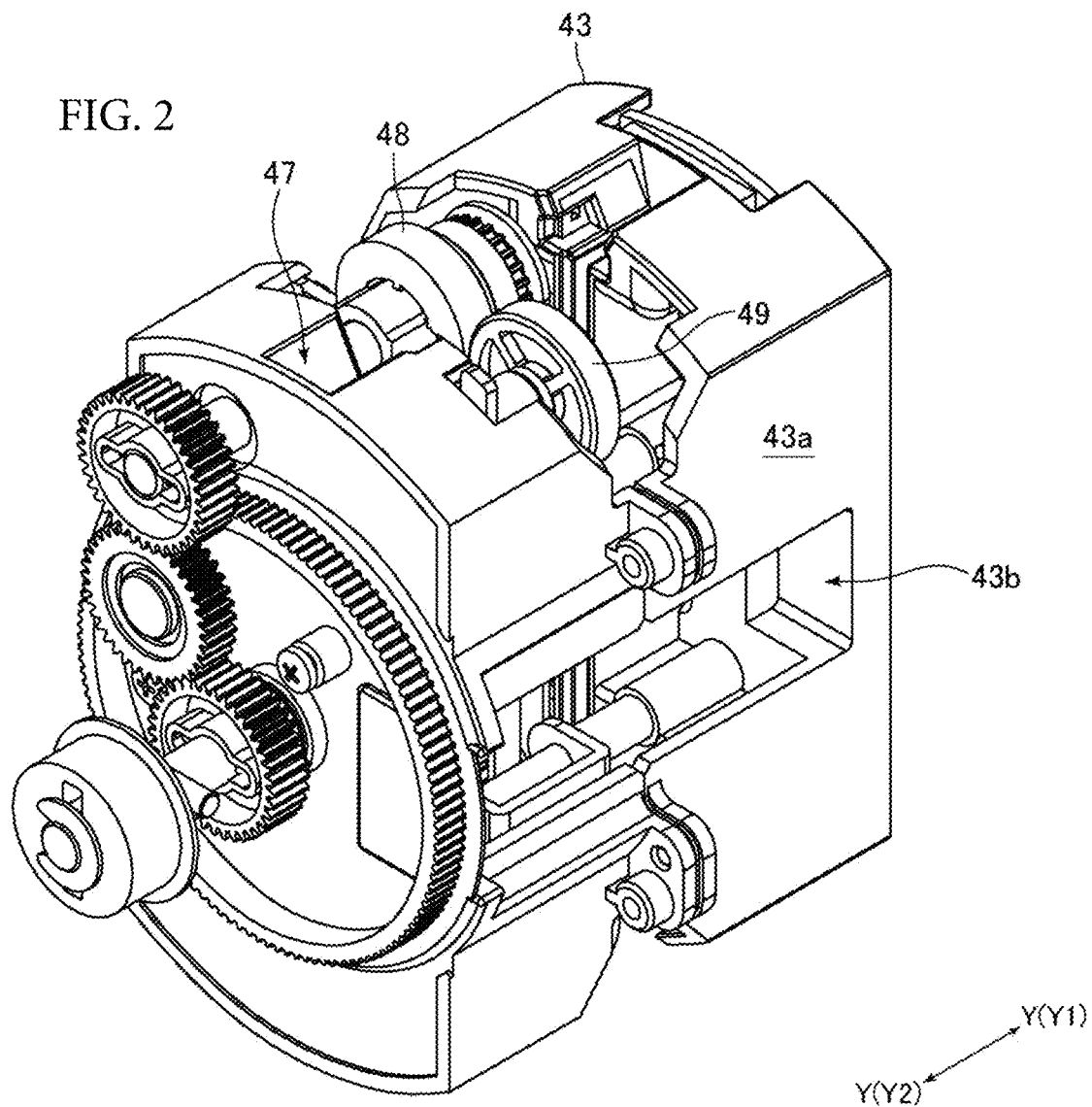
FIG. 2 is a perspective view of a card holding part illustrated in FIG. 1.
Figure 3:
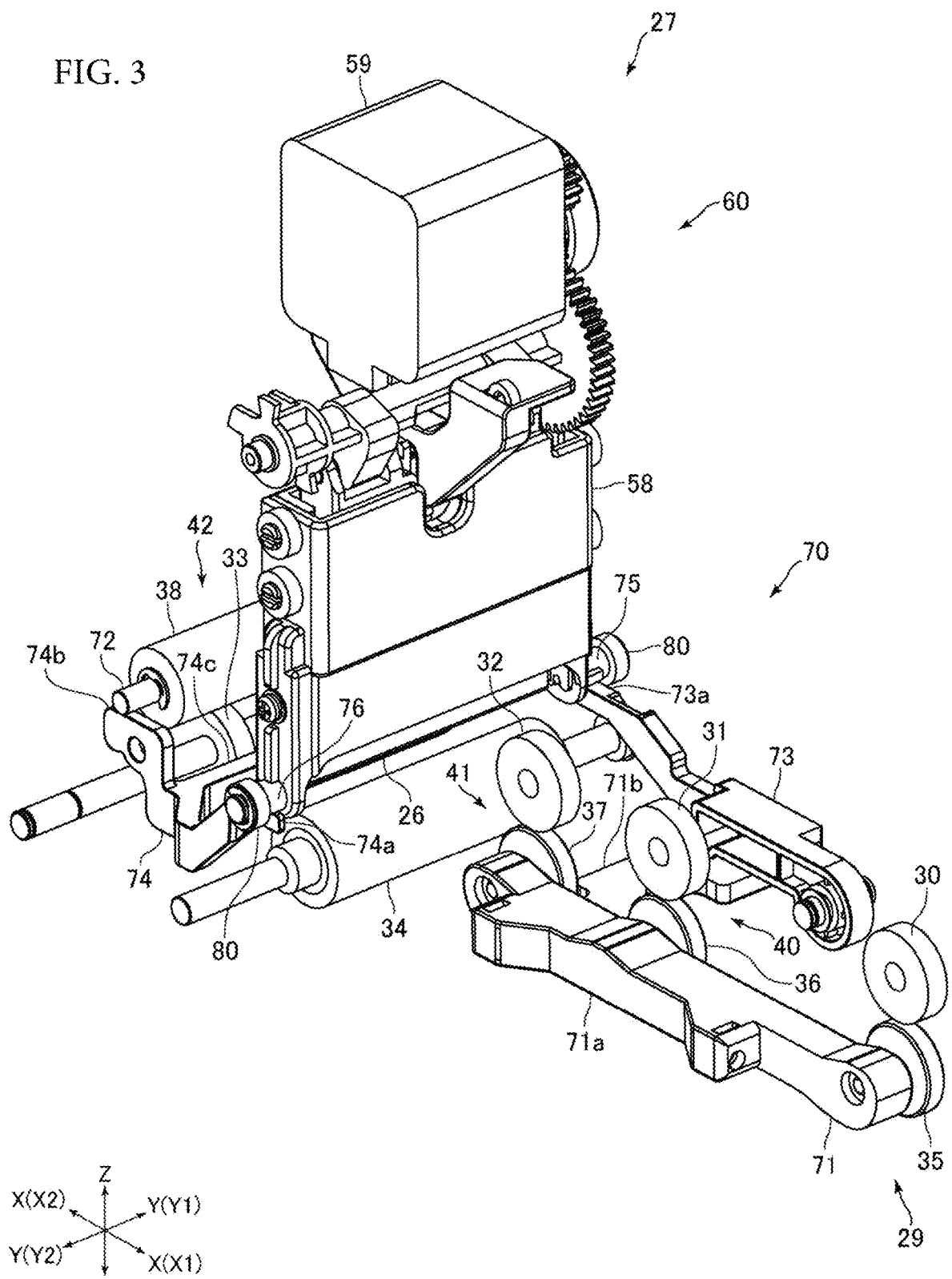
FIG. 3 is a perspective view illustrating a part of a configuration related to a thermal head and a card conveyance mechanism illustrated in FIG. 1.

FIG. 1 is a diagram illustrating a schematic configuration of a card processing device 1 according to an embodiment of the present invention viewed from one side. FIG. 2 is a perspective view of a card holding part 43 illustrated in FIG. 1. FIG. 3 is a perspective view illustrating a part of a configuration related to a thermal head 26 and a card conveyance mechanism 29 illustrated in FIG. 1. Note that an X direction in FIG. 1 and other drawings is a front-rear direction of the card processing device 1, a Z direction in FIG. 1 and other drawings is an up-down direction of the card processing device 1, and a Y direction in FIG. 1 and other drawings is a left-right direction of the card processing device 1 orthogonal to the front-rear direction and the up-down direction. In addition, an X1 direction side in the front-rear direction is a front side of the card processing device 1, an X2 direction side that is opposite to the X1 direction side is a rear side of the card processing device 1, a Y1 direction side in the left-right direction is a right side of the card processing device 1, and a Y2 direction side that is opposite to the Y1 direction side is a left side of the card processing device 1.

The card processing device 1 of the present embodiment is a card issuing device that issues a new card 2. Therefore, hereinafter, the card processing device 1 of the present embodiment will be referred to as "card issuing device 1." The card issuing device 1 is mounted and used in, for example, an automated teller machine (ATM). The card issuing device 1 is mounted in an ATM such that a front end side of the card issuing device 1 faces the front side of the ATM.

The card issuing device 1 includes a card stack unit 3 in which new cards 2 before issue are contained, a card reader unit 4 that performs at least one of reading of data recorded on the card 2 and recording of data on the card 2, a print unit 5 that prints on the card 2, a card inverting unit 6 that inverts front/rear of the card 2, and two card collection containers 7 and 8 in which the card 2 is collected.

The card 2 is, for example, made of vinyl chloride with a thickness of about 0.7 mm to 0.8 mm and is substantially rectangular in shape. Magnetic stripes for recording magnetic data are formed, for example, on a surface of the card 2. Further, the card 2 includes a built-in integrated circuit (IC) chip, for example. Note that the card 2 may be made of polyethylene terephthalate (PET) with a thickness of about 0.18 mm to 0.36 mm, or may be made of paper with a predetermined thickness, etc.

The card stack unit 3 includes a card containing part 12 in which the cards 2 before issue are stacked and contained, and a card feeding mechanism 13 that feeds the lowermost one of the cards 2 in the card containing part 12. The card containing part 12 includes a card cassette 14 in which the card 2 is contained, and a main body part 15 in which the card cassette 14 is removably mounted. The card feeding mechanism 13 is disposed on the lower side of the card containing part 12 and overlaps the card containing part 12 in the up-down direction. The card feeding mechanism 13 includes, for example, a feeding claw (not illustrated) that engages the lowermost one of the cards 2 in the card containing part 12 and feeds the card 2 to the outside of the card containing part 12, and a claw feeding mechanism (not illustrated) that moves the feeding claw. The card feeding mechanism 13 feeds the card 2 contained in the card containing part 12 toward the front side.

The card reader unit 4 includes magnetic heads 18 and 19 that perform at least one of reading of magnetic data recorded on the card 2 and recording of magnetic data on the card 2. In a case in which the card 2 is a contact-type IC card, the card reader unit 4 is provided with an IC contact spring (not illustrated) that is in contact with an external connection terminal of the IC chip of the card 2. In a case in which the card 2 is a non-contact type IC card, the card reader unit 4 is provided with an antenna (not illustrated) for communicating with an antenna of the card 2 in a non-contact manner. An insertion/ejection port 4a of the card 2 is formed at a front end of the card reader unit 4. Note that the card reader unit 4 does not necessarily have to include the magnetic head 18 or the magnetic head 19.

The print unit 5 includes an ink ribbon cartridge 25 that includes a supply roll 23 on which the ink ribbon 22 is wound and a take-up roll 24 on which the ink ribbon 22 supplied from the supply roll 23 is taken up, the thermal head 26 that heats the ink ribbon 22 and transfers ink of the ink ribbon 22 to print on the card 2, a head moving mechanism 27 that moves the thermal head 26 in the up-down direction (see FIG. 3), and a ribbon feeding mechanism (not illustrated) that feeds the ink ribbon 22 from the supply roll 23 to the take-up roll 24.

A conveyance path 28 along which the card 2 is conveyed is formed inside the card reader unit 4 and the print unit 5. In the conveyance path 28, the card 2 is conveyed in a state in which a longitudinal direction of the card 2 that is substantially rectangular in shape substantially matches the front-rear direction. The card reader unit 4 and the print unit 5 are provided with a card conveyance mechanism 29 that conveys the card 2 in the conveyance path 28. The card conveyance mechanism 29 includes three drive rollers 30, 31, and 32 that form a part of the card reader unit 4, and a drive roller 33 and a platen roller 34 that form a part of the print unit 5. The card conveyance mechanism 29 conveys the card 2 in the front-rear direction. A common driving source (more specifically, an unillustrated motor) is connected to the drive rollers 30 to 33 and the platen roller 34 via a power transmission mechanism (not illustrated).

The front-rear direction (X direction) in the present embodiment is a first direction that is a conveyance direction of the card 2 conveyed by the card conveyance mechanism 29. The up-down direction (Z direction) is a second direction that is a thickness direction of the card 2 conveyed by the card conveyance mechanism 29. The left-right direction (Y direction) is a third direction orthogonal to the first direction and the second direction. The front side (X1 direction side) of the present embodiment is a fourth direction side that is one side in the first direction, and a rear side (X2 direction side) is a fifth direction side that is opposite to the fourth direction side.

The drive rollers 30 to 32 are arranged to face the conveyance path 28 from above. Further, the drive rollers 30, 31, and 32 are arranged from the front side toward the rear side in this order and at predetermined intervals. Pad rollers 35, 36, and 37 are arranged to face the drive rollers 30, 31, and 32, respectively. The pad rollers 35 to 37 are arranged to face the conveyance path 28 from below. Further, the pad rollers 35 to 37 are urged toward the drive rollers 30 to 32.

The drive roller 33 and the platen roller 34 are arranged to face the conveyance path 28 from below. The platen roller 34 is located on the rear side of the drive roller 32. The drive roller 33 is located on the rear side of the platen roller 34. A cleaning roller 38 that removes dust on a surface of the card 2 before printing is disposed to face the drive roller 33. The cleaning roller 38 is disposed to face the conveyance path 28 from above. Further, the cleaning roller 38 is urged toward the drive roller 33. The platen roller 34 is disposed immediately below the thermal head 26 and is disposed to face the thermal head 26 in the up-down direction.

In the present embodiment, the drive roller 31 and the pad roller 36 form a conveyance roller pair 40 that conveys the card 2, the card 2 being nipped between the drive roller 31 and the pad roller 36 during conveyance, the drive roller 32 and the pad roller 37 form a conveyance roller pair 41 that conveys the card 2, the card 2 being nipped between the drive roller 32 and the pad roller 37 during conveyance, and the drive roller 33 and the cleaning roller 38 form a conveyance roller pair 42 that conveys the card 2, the card 2 being nipped between the drive roller 33 and the cleaning roller 38 during conveyance.

A magnetic head 18 is disposed to face the conveyance path 28 from above, and a magnetic head 19 is disposed to face the conveyance path 28 from below. The magnetic heads 18 and 19 are disposed at the same positions as the drive roller 31 and the pad roller 36 in the front-rear direction. The magnetic heads 18 and 19 read magnetic data recorded on the card 2 and record magnetic data on the card 2 when the card 2 is conveyed by the card conveyance mechanism 29. More specifically, the magnetic heads 18 and 19 read the magnetic data recorded on the card 2 and record the magnetic data on the card 2 when the card 2 is conveyed by the conveyance roller pairs 40 and 41.

The thermal head 26 is disposed between the supply roll 23 and the take-up roll 24 in the front-rear direction. The thermal head 26 can be in contact with the card 2 from above via the ink ribbon 22. As illustrated in FIG. 3, the head moving mechanism 27 includes a head holding member 58 that holds the thermal head 26, a motor 59 for moving the head holding member 58 in the up-down direction, and a power transmission mechanism 60 that transmits power of the motor 59 to the head holding member 58. The power transmission mechanism 60 is formed by a gear train, an eccentric cam, etc. The motor 59 and the power transmission mechanism 60 are omitted from FIG. 1.

The thermal head 26 is fixed to a lower end side of the head holding member 58. The head holding member 58 is urged upward by a spring member (not illustrated). When the motor 59 rotates, the thermal head 26 and the head holding member 58 move in the up-down direction along a cam surface of an eccentric cam of the power transmission mechanism 60. That is, the head moving mechanism 27 moves the thermal head 26 between a print position 26A (see FIG. 7) in which the thermal head 26 approaches the platen roller 34 and performs printing on the card 2 and a head retracted position 26B (see FIG. 6) in which the thermal head 26 moves upward away from the platen roller 34.

The card inverting unit 6 includes a card holding part 43 that temporarily holds the card 2 therein, a card drawing and feeding mechanism 44 that draws the card 2 into the card holding part 43 and feeds the card 2 out of the card holding part 43, and a rotating mechanism 45 that rotates the card holding part 43 with the left-right direction being a rotational axis direction. The card holding part 43 is formed in a substantially rectangular parallelepiped block shape. The shape of the card holding part 43 when viewed from the left-right direction is substantially rectangle. More specifically, the shape of the card holding part 43 when viewed from the left-right direction is substantially rectangle having two linear long sides and two curved short sides. A width in the longitudinal direction of the card holding part 43 when viewed from the left-right direction is greater than a width (length) in the longitudinal direction of the card 2 that is substantially rectangular in shape.

On one of surfaces (one surface) 43a of the card holding part 43 in a transverse direction of the card holding part 43 when viewed from the left-right direction, a recessed part 43b is formed toward inside in the transverse direction of the card holding part 43. The recessed part 43b is formed at a center of one surface 43a of the card holding part 43 in the longitudinal direction when viewed from the left-right direction. The width in the longitudinal direction of the recessed part 43b of the card holding part 43 is greater than a thickness of the card 2, and a width in the left-right direction of the recessed part 43b is greater than a width in the transverse direction (width in the left-right direction) of the card 2 that is substantially rectangular in shape. one surface 43a of the present embodiment is a first transverse direction side surface.

The card holding part 43 is rotatably supported by a support shaft 46. The support shaft 46 is disposed such that an axis direction of the support shaft 46 matches the left-right direction. The support shaft 46 supports a central part of the card holding part 43 that is substantially rectangular in shape when viewed from the left-right direction. Inside of the card holding part 43, a conveyance path 47 that conveys the card 2 is formed.

The shape of the conveyance path 47 when viewed from the left-right direction is linear. When viewed from the left-right direction, the conveyance path 47 is formed at a center position in the transverse direction of the card holding part 43 that is substantially rectangular in shape, and is formed parallel to the longitudinal direction of the card holding part 43. The conveyance path 47 is disposed at the same position as the conveyance path 28 in the left-right direction. Further, the conveyance path 47 is disposed at the same position as a card feeding port of the card stack unit 3 in the left-right direction. The card 2 temporarily held inside the card holding part 43 is placed in the conveyance path 47 in a state nipped between two drive rollers 48 and two pad rollers 49 which will be described below.

The card drawing and feeding mechanism 44 includes the two drive rollers 48 arranged on both end sides of the conveyance path 47, the two pad rollers 49 each of which is disposed to face each of the two drive rollers 48, a motor 50 that rotates the drive rollers 48, and a power transmission mechanism 51 that transmits the power of the motor 50 to the drive rollers 48. The card drawing and feeding mechanism 44 conveys the card 2 in the longitudinal direction of the card holding part 43 when viewed from the left-right direction. The power transmission mechanism 51 includes a pulley, a belt, a gear train, and the like.

The drive rollers 48 are arranged to face the conveyance path 47 from one side in the thickness direction of the card 2 passing through the conveyance path 47, and the pad rollers 49 are arranged to face the conveyance path 47 from the other side in the thickness direction of the card 2 passing through the conveyance path 47. That is, when viewed from the left-right direction, if a direction orthogonal to the direction in which the conveyance path 47 is formed (the transverse direction of the card holding part 43 when viewed from the left-right direction) is referred to as an orthogonal direction, the drive rollers 48 are arranged to face the conveyance path 47 from one side in the orthogonal direction, and the pad rollers 49 are arranged to face the conveyance path from the other side in the orthogonal direction. The pad rollers 49 are urged toward the drive rollers 48 by an unillustrated spring member.

Further, the pad rollers 49 are located on the side of one surface 43a with respect to the drive rollers 48 in the orthogonal direction, and the recessed part 43b is located on the other side in the orthogonal direction with respect to the conveyance path 47. As described above, the recessed part 43b is formed at the center of one surface 43a of the card holding part 43 in the longitudinal direction. Further, as described above, the conveyance path 47 is formed parallel to the longitudinal direction of the card holding part 43, and each of the two pad rollers 49 is disposed to face each of the two drive rollers 48 disposed at both end sides of the conveyance path 47. That is, the recessed part 43b is formed between the two pad rollers 49 in the longitudinal direction (direction in which the conveyance path 47 is formed) of the card holding part 43 when viewed from the left-right direction.

The rotating mechanism 45 is formed by a motor 54 that rotates the card holding part 43 around the support shaft 46, and a power transmission mechanism 55 that transmits the power of the motor 54 to the card holding part 43. The power transmission mechanism 55 includes a pulley, a belt, and the like. The motors 50 and 54 are arranged below the card holding part 43.

As illustrated in FIG. 1, the card stack unit 3, the card inverting unit 6, the thermal head 26, and the card reader unit 4 are arranged in this order in the front-rear direction. More specifically, the card stack unit 3, the card inverting unit 6, the thermal head 26, and the card reader unit 4 are arranged in this order from the rear side to the front side. That is, the card holding part 43 of the card inverting unit 6 is located on the rear side of the thermal head 26. Further, the card holding part 43 is located on the rear side of the drive roller 33 and the cleaning roller 38.

In the present embodiment, in a state in which the conveyance path 47 is parallel to the front-rear direction when viewed from the left-right direction (that is, a state in which the longitudinal direction of the card holding part 43 matches the front-rear direction when viewed from the left-right direction), the card 2 fed out of the card stack unit 3 to the front side is drawn into the card holding part 43 by the card drawing and feeding mechanism 44. Further, in a state in which the conveyance path 47 is parallel to the front-rear direction when viewed from the left-right direction, the card drawing and feeding mechanism 44 feeds out the card 2 to the front side toward the thermal head 26 and the card reader unit 4.

A distance L1 in the front-rear direction between a center of the thermal head 26 and a center of the conveyance roller pair 41 (see FIG. 6A) is shorter than the length in the front-rear direction of the card 2 conveyed by the card conveyance mechanism 29 (length in the longitudinal direction of the substantially rectangular card 2). A distance L2 in the front-rear direction between the center of the thermal head 26 and a center of the conveyance roller pair 40 (see FIG. 6A) is also shorter than the length in the longitudinal direction of the card 2. Note that a distance L3 in the front-rear direction between the center of the conveyance roller pair 40 and a center of the drive roller 30 and a center of a pad roller 35 (see FIG. 6A) is also shorter than the length in the longitudinal direction of the card 2.

A distance L4 in the front-rear direction between the center of the thermal head 26 and a center of the conveyance roller pair 42 (see FIG. 6A) is shorter than the length in the longitudinal direction of the card 2. Further, in a state in which the conveyance path 47 is parallel to the front-rear direction when viewed from the left-right direction, a distance L5 in the front-rear direction between a center of the drive roller 48 and a center of the pad roller 49 which are disposed on the front side and the center of the thermal head 26 (see FIG. 6A) is shorter than the length in the longitudinal direction of the card 2. In the present embodiment, the distance L2, the distance L3, and the distance L5 are substantially the same.

A card collection container 7 is disposed on the lower side of the card stack unit 3 and is disposed lower rear side of the card holding part 43. A card collection container 8 is disposed on the lower side of the card reader unit 4 and is disposed lower front side of the card holding part 43. In addition, the card collection containers 7 and 8 are arranged at the same position as the card holding part 43 in the left-right direction. Between the card holding part 43 and the card collection container 8, a conveyance path 62 for the card 2 is formed. The conveyance path 62 is disposed at the same position as the card holding part 43 in the left-right direction. A to-be-collected card conveyance mechanism 63 that conveys the card 2 is disposed in the conveyance path 62.

The to-be-collected card conveyance mechanism 63 includes a drive roller 64, a pad roller 65 disposed to face the drive roller 64, a motor 66 that rotates the drive roller 64, a power transmission mechanism 67 that transmits the power of the motor 66 to the drive roller 64. The drive roller 64 is disposed to face the conveyance path 62 from below, and the pad roller 65 is disposed to face the conveyance path 62 from above. The power transmission mechanism 55 includes a pulley, a belt, and the like.

In the present embodiment, when the card holding part 43 is rotated around the support shaft 46, the conveyance path of the card 2 is switched among a first conveyance path in which the card 2 is conveyed from the card holding part 43 toward the card reader unit 4, a second conveyance path in which the card 2 is conveyed from the card holding part 43 toward the card collection container 7, and a third conveyance path in which the card 2 is conveyed from the card holding part 43 toward the card collection container 8.

(Configuration of Roller Retraction Mechanism)

Figure 5A:
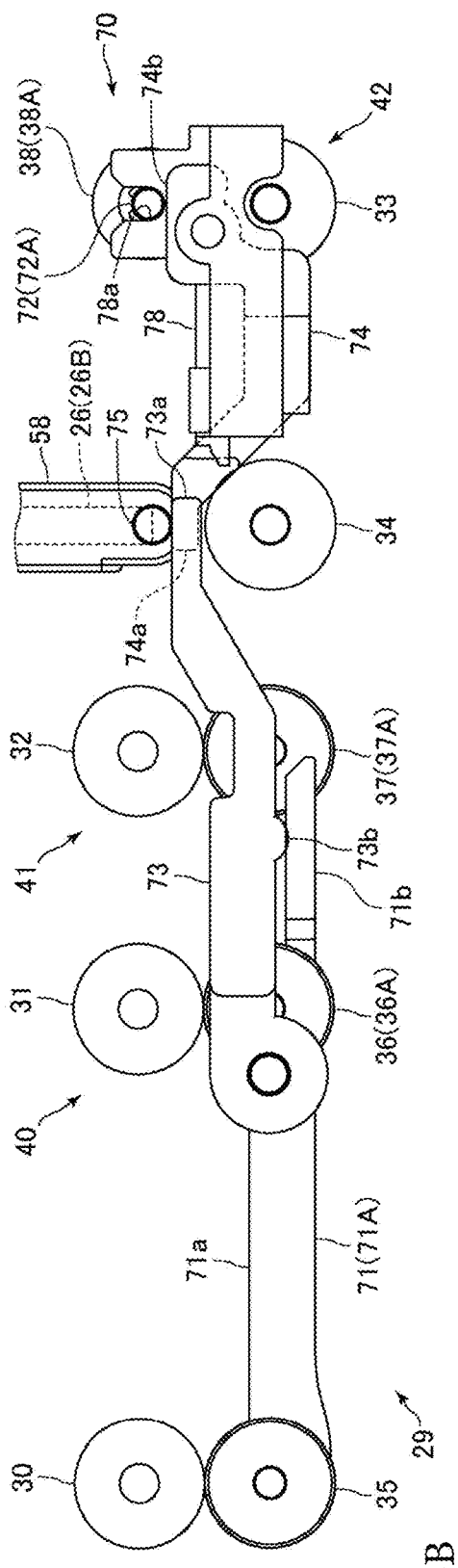
FIG. 5 is a diagram illustrating a configuration of a roller retraction mechanism illustrated in FIG. 3 viewed from the other side of the third direction.
Figure 5B:
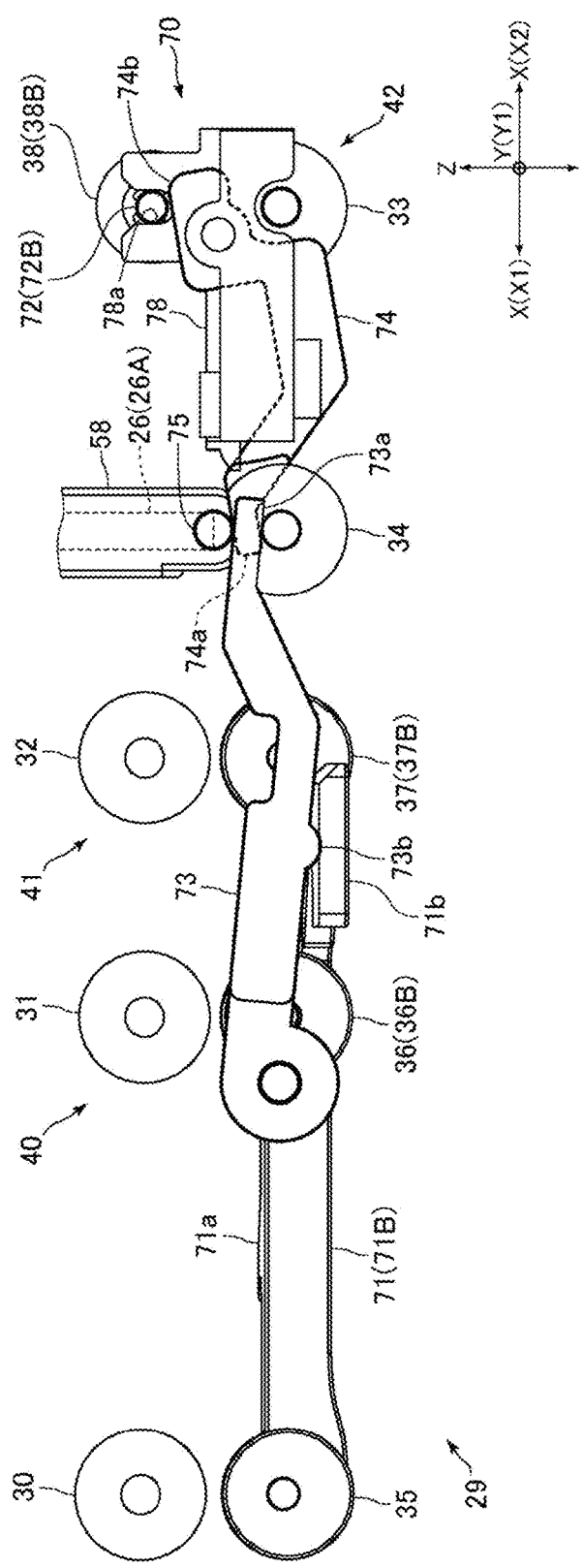

FIG. 4 is a diagram illustrating a configuration of the roller retraction mechanism 70 illustrated in FIG. 3 when viewed from the left side. FIG. 5 is a diagram illustrating a configuration of the roller retraction mechanism 70 illustrated in FIG. 3 when viewed from the right side.

The card processing device 1 of the present embodiment is provided with a roller retraction mechanism 70 that retracts the pad rollers 36 and 37 and the cleaning roller 38. The roller retraction mechanism 70 includes a support block 71 that rotatably supports the pad rollers 36 and 37, a support shaft 72 that rotatably supports the cleaning roller 38, a lever member 73 that moves the support block 71, a lever member 74 that moves the support shaft 72, and two support shafts 75 and 76 attached to the head holding member 58.

The support block 71 rotatably supports the pad roller 35 in addition to the pad rollers 36 and 37. The support block 71 includes a roller support part 71a that rotatably supports the pad rollers 35 to 37 and a lever contact part 71b with which the lever member 73 is to be in contact. The roller support part 71a is formed in a substantially rectangular parallelepiped block shape oblong in the front-rear direction. Three fixing shafts protruding to the right from a right surface of the roller support part 71a are fixed to the roller support part 71a, and each of the three pad rollers 35 to 37 is rotatably supported by each of the three fixing shafts. That is, the pad rollers 35 to 37 are disposed on the right side of the roller support part 71a. The lever contact part 71b is formed in a flat plate shape. The lever contact part 71b protrudes to the right from a position between the pad roller 36 and the pad roller 37 on the right surface of the roller support part 71a.

The support block 71 is rotatable with the front-rear direction being a rotational axis direction. Further, the support block 71 is rotatable around a left end portion of the support block 71 as a center of rotation. More specifically, the left end portion of the support block 71 is rotatably supported by a support shaft (not illustrated) disposed with the front-rear direction being a shaft direction. The support block 71 is urged by an unillustrated spring member in a direction in which the pad rollers 35 to 37 are in contact with the drive rollers 30 to 32 around the support shaft.

The support block 71 can rotate between a first block position 71A in which the pad rollers 36 and 37 are located in roller contact positions 36A and 37A, respectively, in which the pad rollers 36 and 37 are in contact with the drive rollers 31 and 32, and a second block position 71B in which the pad rollers 36 and 37 are located in roller retracted positions 36B and 37B, respectively, in which the pad rollers 36 and 37 are moved away from the drive rollers 31 and 32. That is, the support block 71 is movable between the first block position 71A and the second block position 71B. When the support block 71 is located in the first block position 71A, the pad roller 35 is also in contact with the drive roller 30. When the support block 71 is located in the second block position 71B, the pad roller 35 is also moved away from the drive roller 30.

The lever member 73 is located on the right side of the drive rollers 30 to 32 and the pad rollers 35 to 37. The lever member 73 is rotatable with the left-right direction being the rotational axis direction. Further, the lever member 73 is rotatable around the front end portion of the lever member 73 as a center of rotation. A rear end portion of the lever member 73 is a shaft contact part 73a with which a support shaft 75 is to be in contact from above. The shaft contact part 73a is disposed on the right side of the head holding member 58. At an intermediate position of the lever member 73 in the front-rear direction, a block contact part 73b with which the lever contact part 71b is to be in contact from above is formed. The block contact part 73b is a substantially semi-circular protrusion protruding downward from a lower surface of the lever member 73. The block contact part 73b is to be in contact with the lever contact part 71b from above and moves the support block 71 located in the first block position 71A to the second block position 71B.

The support shaft 72 is disposed such that the shaft direction of the support shaft 72 matches the left-right direction. The support shaft 72 is inserted in an inner peripheral side of the cleaning roller 38. Both end portions of the support shaft 72 protrude outward from the cleaning roller 38 in the left-right direction. Both end portions of the support shaft 72 are supported by a shaft support member 78. In the shaft support member 78, a support groove 78a that supports both end portions of the support shaft 72 is formed. The support groove 78a is formed in a U-shaped groove shape opening at its upper end. Further, the support shaft 72 is urged downward by an unillustrated spring member. That is, the support shaft 72 is urged in a direction in which the cleaning roller 38 is to be in contact with the drive roller 33. Note that the shaft support member 78 is omitted from FIG. 3.

The support shaft 72 is movable in the up-down direction along the support groove 78a between a first shaft position 72A in which the cleaning roller 38 is located in a roller contact position 38A in which the cleaning roller 38 is in contact with the drive roller 33, and a second shaft position 72B in which the cleaning roller 38 is located in a roller retracted position 38B in which the cleaning roller 38 is moved away from the drive roller 33.

The lever member 74 is rotatable with the left-right direction being the rotational axis direction. Further, the lever member 74 is rotatable around a rear end portion of the lever member 74 as a center of rotation. A front end portion of the lever member 74 is a shaft contact part 74*a* with which a support shaft 76 is to be in contact from above. The shaft contact part 74*a* is disposed on the left side of the head holding member 58. Further, a rear end side portion of the lever member 74 is formed by two shaft contact parts 74*b* each of which is to be in contact with each of both end portions of the support shaft 72 from below, and a connecting portion 74*c* that connects the two shaft contact parts 74*b* (see FIG. 3).

Each of the two shaft contact parts 74*b* is disposed on each of the left and right end sides of the rear end side portion of the lever member 74. Further, the shaft contact parts 74*b* are disposed on the rear side of a center of rotation of the lever member 74. The shaft contact parts 74*b* are in contact with both end portions of the support shaft 72 from below and move the support shaft 72 located in the first shaft position 72A to the second shaft position 72B.

The support shafts 75 and 76 are cylindrical in shape. The support shafts 75 and 76 are arranged such that the shaft direction of the support shafts 75 and 76 match the left-right direction. The support shaft 75 is fixed to the head holding member 58 so as to protrude to the right from a lower end side of a right surface of the head holding member 58. The support shaft 76 is fixed to the head holding member 58 so as to protrude to the left from a lower end side of a left surface of the head holding member 58. A roller 80 is rotatably attached to a distal end side (right end side) of the support shaft 75 and to a distal end side (left end side) of the support shaft 76. The roller 80 engages a guide member (not illustrated) that guides the roller 80 in the up-down direction. The thermal head 26 and the head holding member 58 are guided by the roller 80 and the guide member in the up-down direction.

When the thermal head 26 is located in the head retracted position 26B and the head holding member 58 is raised, the pad rollers 36 and 37 are located in the roller contact positions 36A and 37A with urging force of a spring member (not illustrated) urging the support block 71, and the cleaning roller 38 is located in the roller contact position 38A with urging force of a spring member (not illustrated) urging the support shaft 72. That is, at this time, the support block 71 is located in the first block position 71A, and the support shaft 72 is located in the first shaft position 72A.

When the head holding member 58 is lowered such that the thermal head 26 located in the head retracted position 26B is moved to a print position 26A, the support shaft 75 is to be in contact with the shaft contact part 73*a* of the lever member 73 and pushes down the shaft contact part 73*a*, whereby the lever member 73 is rotated. When the lever member 73 is rotated, the block contact part 73*b* of the lever member 73 is to be in contact with the lever contact part 71*b* of the support block 71 and pushes down the lever contact part 71*b*, whereby the support block 71 located in the first block position 71A is moved to the second block position 71B. That is, the pad rollers 36 and 37 located in the roller contact positions 36A and 37A retract downward and move to the roller retracted positions 36B and 37B.

When the head holding member 58 is lowered such that the thermal head 26 located in the head retracted position 26B is moved to a print position 26A, the support shaft 76 is to be in contact with the shaft contact part 74*a* of the lever member 74 and pushes down the shaft contact part 74*a*, whereby the lever member 74 is rotated. When the lever member 74 is rotated, the shaft contact part 74*b* of the lever member 74 is to be in contact with the support shaft 72 and pushes up the support shaft 72, and the support shaft 72 located in the first shaft position 72A is moved to the second shaft position 72B. That is, the cleaning roller 38 located in the roller contact position 38A is retracted upward and moved to the roller retracted position 38B.

In this manner, when the thermal head 26 is moved to the print position 26A, the roller retraction mechanism 70 moves the pad rollers 36 and 37 to the roller retracted positions 36B and 37B and moves the cleaning roller 38 to the roller retracted position 38B. Further, the roller retraction mechanism 70 moves the pad rollers 36 and 37 to retract downward and moves the cleaning roller 38 to retract upward. The support shaft 75 is to be in contact with the lever member 73 to rotate the lever member 73, whereby the support block 71 located in the first block position 71A is moved to the second block position 71B. The support shaft 76 is to be in contact with the member 74 to rotate the lever member 74, whereby the support shaft 72 located in the first shaft position 72A is moved to the second shaft position 72B.

When the thermal head 26 is moved to the print position 26A, the pad rollers 36 and 37 are moved to the roller retracted positions 36B and 37B, and the cleaning roller 38 is moved to the roller retracted position 38B. Therefore, the platen roller 34 conveys the card 2 in the front-rear direction when printing is performed on the card 2 with the thermal head 26.

(Operation of Card Issuing Device)

FIG. 6 and FIG. 7 are schematic diagrams illustrating an operation of the card processing device 1 illustrated in FIG. 1 when the card 2 is to be issued.

As described above, the card issuing device 1 is mounted in an ATM. When cash is to be withdrawn or transferred in the ATM, the card reader unit 4 performs predetermined processing on the card 2 inserted from the insertion/ejection port 4*a*, and then ejects the card 2 from the insertion/ejection port 4*a*. When the card 2 inserted into the insertion/ejection port 4*a* reaches a position between the drive roller 30 and the pad roller 35 and is nipped between the drive roller 30 and the pad roller 35, the pad roller 35 is moved downward by the thickness of the card 2. When the pad roller 35 is moved downward, the support block 71 is rotated, and the pad rollers 36 and 37 are also moved downward by the thickness of the card 2.

When the card 2 is newly issued by the ATM, as illustrated in FIG. 1, the card stack unit 3 feeds the card 2 in a state in which the conveyance path 47 is parallel to the front-rear direction. When the card stack unit 3 feeds the card 2, the thermal head 26 is located in the head retracted position 26B, the support block 71 is located in the first block position 71A, and the support shaft 72 is located in the first shaft position 72A. That is, the pad rollers 36 and 37 are located in the roller contact positions 36A and 37A, and the cleaning roller 38 is located in the roller contact position 38A.

Thereafter, as illustrated in FIG. 6A, the card drawing and feeding mechanism 44 draws the card 2 that is fed out of the card stack unit 3 into the card holding part 43, and as illustrated in FIG. 6B, the card drawing and feeding mechanism 44 and the card conveyance mechanism 29 convey the card 2 to the front side to a position at which the rear end of the card 2 is located on the front side of the thermal head 26. When the card 2 is conveyed to a position at which the rear end of the card 2 is located on the front side of the thermal head 26, a front surface (upper surface) of the card 2 is cleaned by an action of the cleaning roller 38.

After that, the card conveyance mechanism 29 conveys the card 2 to the rear side until the rear end of the card 2 is located on the lower side of the thermal head 26, and then, as illustrated in FIG. 7A, the thermal head 26 located in the head retracted position 26B is lowered to move to the print position 26A. When the thermal head 26 is moved to the print position 26A, the support block 71 located in the first block position 71A is moved to the second block position 71B, and the support shaft 72 located in the first shaft position 72A is moved to the second shaft position 72B. That is, the pad rollers 36 and 37 are moved to the roller retracted positions 36B and 37B and the cleaning roller 38 is moved to the roller retracted position 38B.

Thereafter, while the card conveyance mechanism 29 (more specifically, the platen roller 34) conveys the card 2 to the rear side, the thermal head 26 prints text or the like on a front surface of the card 2. As described above, in the state in which the conveyance path 47 is parallel to the front-rear direction when viewed from the left-right direction, the distance L5 in the front-rear direction between the center of the drive roller 48 and the center of the pad roller 49 that are disposed on the front side and the center of the thermal head 26 is shorter than the length in the longitudinal direction of the card 2. Therefore, when printing is performed on the card 2 while conveying the card 2 to the rear side in a state in which the conveyance path 47 is parallel to the front-rear direction, it is possible that the rear end portion of the card 2 enters between the drive roller 48 and the pad roller 49 which are disposed on the front side when printing is performed on the card 2.

In the present embodiment, in order to prevent the rear end portion of the card 2 during printing from entering between the drive roller 48 and the pad roller 49, the rotating mechanism 45 rotates the card holding part 43 such that the conveyance path 47 is inclined with respect to the front-rear direction when viewed from the left-right direction when printing is performed on the card 2 with the thermal head 26. More specifically, as illustrated in FIG. 7, in order to prevent the rear end portion of the card 2 from being in contact with the card holding part 43. The rotating mechanism 45 rotates the card holding part 43 such that the conveyance path 47 is inclined 90 degrees with respect to the front-rear direction when viewed from the left-right direction.

Further, even when the rear end portion of the card 2 during printing reaches the card holding part 43, as illustrated in FIG. 7B, the rotating mechanism 45 rotates the card holding part 43 such that one surface 43a faces the front side and that the rear end portion of the card 2 is located within the recessed part 43b. That is, the recessed part 43b is provided to prevent contact between the rear end portion of the card 2 that is conveyed to the rear side during printing on the card 2 and the card holding part 43, and when the card holding part 43 is rotated during printing on the card 2, an opening of the recessed part 43b faces the front.

When printing is to be performed on the back side of the card 2 after the printing on the front side of the card 2 is completed, the thermal head 26 located in the print position 26A is raised and moved to the head retracted position 26B. After the card conveyance mechanism 29 once conveys the card 2 to the front side, the card holding part 43 is rotated (the rotating mechanism 45 rotates the card holding part 43) such that the conveyance path 47 becomes parallel to the front-rear direction, and the card conveyance mechanism 29 and the card drawing and feeding mechanism 44 convey the card 2 to the rear side until the card 2 is held in the card holding part 43.

Thereafter, after the card holding part 43 is rotated 180 degrees to invert the card 2, the card drawing and feeding mechanism 44 and the card conveyance mechanism 29 convey the card 2 to the front side to a position at which the rear end of the card 2 is located on the front side of the thermal head 26. When the card 2 is conveyed to a position at which the rear end of the card 2 is located on the front side of the thermal head 26, a back surface of the card 2 is cleaned by an action of the cleaning roller 38. After that, as described above, the thermal head 26 is moved to the print position 26A, and the thermal head 26 prints text or the like on the back surface of the card 2 while the card conveyance mechanism 29 conveys the card 2 to the rear side.

When the printing of the card 2 is completed, the thermal head 26 is moved from the print position 26A to the head retracted position 26B, and then the card conveyance mechanism 29 conveys the card 2 to the front side. Further, after the card reader unit 4 performs predetermined processing such as recording magnetic data on the card 2, the card 2 is issued from the insertion/ejection port 4a. Here, if a predetermined error occurs during processing in the card reader unit 4, the card conveyance mechanism 29 and the card drawing and feeding mechanism 44 convey the card 2 to the rear side until the card 2 on which the error has occurred is held inside the card holding part 43. Thereafter, after the card holding part 43 is rotated such that the card 2 is to be conveyed from the card holding part 43 to the card collection container 7, the card drawing and feeding mechanism 44 conveys the card 2 toward the card collection container 7, and the card 2 is collected in the card collection container 7.

When the card 2 is updated to a new card 2 in the ATM, until the used card 2 inserted from the insertion/ejection port 4a is held in the card holding part 43, the card conveyance mechanism 29 and the card drawing and feeding mechanism 44 first convey the card 2. Thereafter, after the card holding part 43 is rotated such that the card 2 is to be conveyed from the card holding part 43 to the card collection container 8, the card drawing and feeding mechanism 44 feeds the card 2 to the conveyance path 62. The to-be-collected card conveyance mechanism 63 holds the card 2 fed out to the conveyance path 62 between the drive roller 64 and the pad roller 65.

When the card 2 is fed out to the conveyance path 62, as described above, the card stack unit 3 feeds out the card 2 and the thermal head 26 performs printing on the card 2. Thereafter, the card reader unit 4 performs predetermined processing and the card 2 is issued from the insertion/ejection port 4a. When the card 2 is issued from the insertion/ejection port 4a, the to-be-collected card conveyance mechanism 63 conveys the card 2 held between the drive roller 64 and the pad roller 65 toward the card collection container 8, and the used card 2 is collected in the collection container 8.

If an error occurs during issuance of a new card 2 and the card 2 held between the drive roller 64 and the pad roller 65 has to be returned to a user, the to-be-collected card conveyance mechanism 63 and the card drawing and feeding mechanism 44 convey this card 2 until this card 2 is held in the card holding part 43. Thereafter, after the card holding part 43 is rotated such that the card 2 is conveyed from the card holding part 43 to the card reader unit 4, the card drawing and feeding mechanism 44 and the card conveyance mechanism 29 convey the card 2, and the card 2 is ejected from the insertion/ejection port 4a.

(Main Effect of Present Embodiment)

As described above, in the present embodiment, when the thermal head 26 is moved to the print position 26A, the pad rollers 36 and 37 are moved to the roller retracted positions 36B and 37B. That is, in the present embodiment, even if pad pressure of the pad rollers 36 and 37 with respect to the drive rollers 31 and 32 is high to ensure conveyance force of the card 2 when the magnetic heads 18 and 19 are in contact with the card 2 to read magnetic data or to record magnetic data, the pad rollers 36 and 37 are moved away from the drive rollers 31 and 32 when printing is performed on the card 2. Further, in the present embodiment, when the thermal head 26 is moved to the print position 26A, the cleaning roller 38 is moved to the roller retracted position 38B. That is, in the present embodiment, even if the pad pressure of the cleaning roller 38 with respect to the drive roller 33 is high in order to clean the upper surface of the card 2 before printing, the cleaning roller 38 moved away from the drive roller 33 when printing is performed on the card 2.

Therefore, in the present embodiment, even if the distance L1 in the front-rear direction between the center of the thermal head 26 and the center of the conveyance roller pair 41, the distance L2 in the front-rear direction between the center of the thermal head 26 and the center of the conveyance roller pair 40, and the distance L4 in the front-rear direction between the center of the head 26 and the center of the conveyance roller pair 42 are shorter than the length in the longitudinal direction of the card 2, when printing is performed on the card 2, it is possible to prevent the rear end portion of the card 2 from entering between the drive roller 33 and the cleaning roller 38 so that the rear end portion of the card 2 abuts the contact portion between the drive roller 33 and the cleaning roller 38, the front end portion of the card 2 from falling out from between the drive roller 31 and the pad roller 36 such that the card 2 jumps out from between the drive roller 31 and the pad roller 36, and the front end portion of the card 2 from falling out from between the drive roller 32 and the pad roller 37 such that the card 2 jumps out from between the drive roller 32 and the pad roller 37.

Further, in the present embodiment, when printing is performed on the card 2 with the thermal head 26, the card holding part 43 is rotated such that the conveyance path 47 is inclined with respect to the front-rear direction when viewed from the left-right direction. Therefore, in the present embodiment, in the state in which the conveyance path 47 is parallel to the front-rear direction when viewed from the left-right direction, even if the distance L5 in the front-rear direction between the center of the drive roller 48 and the center of the pad roller 49 that are disposed on the front side and the center of the thermal head 26 is shorter than the length in the longitudinal direction of the card 2, it is possible to prevent the rear end portion of the card 2 from being in contact with the contact portion between the drive roller 48 and the pad roller 49 during printing on the card 2.

Therefore, in the present embodiment, even if the distance L5 is shorter than the length in the longitudinal direction of the card 2, and even if the pad pressure of the pad roller 49 with respect to the drive roller 48 becomes high in order to draw the card 2 into the card holding part 43 and feed the card 2 out of the card holding part 43, it is possible to prevent the rear end portion of the card 2 from entering between the drive roller 48 and the pad roller 49 such that the rear end portion of the card 2 abuts the contact portion between the drive roller 48 and the pad roller 49 during printing on the card 2. In addition, in the present embodiment, the shape of the card holding part 43 is substantially rectangular when viewed from the left-right direction, and the card holding part 43 is rotated such that the conveyance path 47 is inclined with respect to the front-rear direction when viewed from the left-right direction (that is, the longitudinal direction of the card holding part 43 when viewed from the left-right direction is inclined with respect to the front-rear direction) during printing on the card 2. Therefore, it is possible to prevent the rear end portion of the card 2 from being in contact with the card holding part 43 during printing on the card 2.

As a result, in the present embodiment, even if the distance L1, the distance L2, the distance L4, and the distance L5 are shorter than the length in the longitudinal direction of the card 2, it is possible to prevent a change in the conveyance speed of the card 2 when printing is performed on the card 2 and to maintain printing quality of the card 2. That is, in the present embodiment, in the card issuing device 1 having functions of dual-sided printing on the card 2, reading data recorded on the card 2, recording data on the card 2, and cleaning of the card 2 in addition to the function of dual-sided printing on the card 2, it is possible to downsize the card issuing device 1 in the front-rear direction by shortening the distance L1, the distance L2, and the distance L4, and shortening the distance in the front-rear direction between the card holding part 43 and the thermal head 26 while maintaining the printing quality of the card 2.

In the present embodiment, when printing is performed on the card 2, the card holding part 43 is rotated such that the conveyance path 47 is inclined 90 degrees with respect to the front-rear direction when viewed from the left-right direction. Therefore, in the present embodiment, even if the distance in the front-rear direction between the card holding part 43 and the thermal head 26 is shortened. Therefore, it is possible to prevent the rear end portion of the card 2 from being in contact with the card holding part 43 during printing on the card 2. Therefore, in the present embodiment, the card issuing device 1 can be further downsized in the front-rear direction.

Further, in the present embodiment, the recessed part 43b is formed in one surface 43a of the card holding part 43 and, when the card holding part 43 is rotated during printing on the card 2, one surface 43a of the card holding part 43 faces the front side such that the rear end portion of the card 2 is located inside the recessed part 43b. Therefore, in the present embodiment, even if the distance in the front-rear direction between the card holding part 43 and the thermal head 26 is shortened. Therefore, it is possible to prevent the rear end portion of the card 2 from being in contact with the card holding part 43 during printing on the card 2. Therefore, in the present embodiment, the card issuing device 1 can be further downsized in the front-rear direction.

In the present embodiment, the drive rollers 48 are arranged to face the conveyance path 47 from one side in the transverse direction (orthogonal direction) of the card holding part 43 when viewed from the left-right direction, and a part of the power transmission mechanism 51 that transmits power of the motor 50 to the drive roller 48 is located on one side in the orthogonal direction with respect to the conveyance path 47. The pad rollers 49 are arranged to face the conveyance path 47 from the other side in the orthogonal direction, and a part of the power transmission mechanism 51 is not located on the other side in the orthogonal direction with respect to the conveyance path 47. Therefore, in the present embodiment, the recessed part 43b to be formed on the other side in the orthogonal direction with respect to the conveyance path 47 is easily formed.

OTHER EMBODIMENTS

The embodiment described above is one possible embodiment of the present invention, but the invention is not limited to this. Various modified embodiments are possible without departing from the scope of the present invention.

In the embodiment described above, when printing is performed on the card 2, the card holding part 43 is rotated such that the conveyance path 47 is inclined 90 degrees with respect to the front-rear direction when viewed from the left-right direction. However, the inclination of the conveyance path 47 of the card holding part 43 rotated during printing on the card 2 with respect to the front-rear direction does not necessarily have to be 90 degrees if the distance in the front-rear direction between the card holding part 43 and the thermal head 26 can be made longer than that in the embodiment described above (that is, it is not possible that the rear end portion of the card 2 conveyed to the rear side during printing is to be in contact with the holding part 43 after rotation). In this case, if the rear end portion of the card 2 conveyed to the rear side during printing is to be in contact with the rotated card holding part 43, a recessed part for preventing contact between the rotated card holding part 43 and the rear end portion of the card 2 may be formed in the card holding part 43.

In the embodiment described above, the recessed part 43b is formed in one surface 43a. However, the recessed part 43b may be formed in the surface opposite to one surface 43a. Further, if the distance in the front-rear direction between the card holding part 43 and the thermal head 26 can be made longer than that in the embodiment described above (that is, if it is not possible that the rear end portion of the card 2 conveyed to the rear side during printing is to be in contact with the rotated card holding part 43), the recessed part 43b does not necessarily have to be formed in the card holding part 43.

In the embodiment described above, the shape of the card holding part 43 when viewed from the left-right direction is substantially rectangle. However, the shape of the card holding part 43 when viewed from the left-right direction may be square, any four-sided shape other than rectangle and square, or any polygon other than four-sided shape. Further, the shape of the card holding part 43 when viewed from the left-right direction may be circle, an ellipse, or oval. If the shape of the card holding part 43 is square or circular when viewed from the left-right direction, a recessed part for preventing the rear end portion of the card 2 conveyed to the rear side during printing from being in contact with the rotated card holding part 43 is formed in the card holding part 43.

In the embodiment described above, the card drawing and feeding mechanism 44 includes the two drive rollers 48 arranged on both end sides of the conveyance path 47, and the two pad rollers 49 each of which is disposed to face each of the two drive rollers 48. However, the card drawing and feeding mechanism 44 may include, in addition to the two drive rollers 48 and the pad rollers 49, a drive roller disposed in an intermediate position of the conveyance path 47 and a pad roller disposed to face this drive roller.

In the embodiment described above, if no magnetic stripes are formed on the card 2, the card reader unit 4 does not necessarily have to include the magnetic heads 18 and 19. In this case, the pad pressure of the pad rollers 36 and 37 with respect to the drive rollers 31 and 32 may be lowered.

Further, if the pad pressure of the pad rollers 36 and 37 against the drive rollers 31 and 32 is lowered, it is not necessary to make the pad rollers 36 and 37 retracted during printing on the card 2. Further, in the embodiment described above, in place of the cleaning roller 38, a pad roller may be disposed to face the drive roller 33. In this case, the pad pressure of the pad roller with respect to the drive roller 33 may be lowered. Further, if the pad pressure of the pad roller against the drive roller 33 is lowered, it is not necessary to make the pad roller retracted during printing on the card 2.

In the embodiment described above, the card issuing device 1 is mounted in an ATM. However, the card issuing device 1 may be mounted in a higher-level device other than an ATM, or may be used alone. Further, in the embodiment described above, another processing unit such as a scanner unit that reads an image of a surface of the card 2 may be provided on the front side of the thermal head 26 instead of the card reader unit 4. Further, in the embodiment described above, the card issuing device 1 does not necessarily have to include the card reader unit 4. In the embodiment described above, the card processing device 1 is a card issuing device. However, the card processing device 1 may be a device that performs predetermined processing on the card 2, other than a card issuing device. In this case, for example, the card processing device 1 includes no card stack unit 3.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card processing device for use with a card, the card processing device comprising:
   a print unit that prints on the card;
   a card inverting unit that inverts front/rear of the card; and
   a controller, wherein
   the print unit comprises a thermal head structured to heat an ink ribbon and transfer ink of the ink ribbon to print on the card, and a card conveyance mechanism structured to convey the card,
   when a conveyance direction of the card conveyed by the card conveyance mechanism is defined as a first direction, a thickness direction of the card conveyed by the card conveyance mechanism is defined as a second direction, a direction orthogonal to the first direction and the second direction is defined as a third direction, one side in the first direction is defined as a fourth direction side, and the other side opposite to the fourth direction side is defined as a fifth direction side,
   the card inverting unit comprises a card holding part structured to temporarily hold the card therein, a card drawing and feeding mechanism structured to draw the card into the card holding part and feed the card out of the card holding part, and a rotating mechanism structured to rotate the card holding part with the third direction being a rotational axis direction,
   a conveyance path along which the card is conveyed is provided inside the card holding part,
   the conveyance path when viewed from the third direction is linear in shape, the thermal head is disposed on the fourth direction side with respect to the card holding part, the card drawing and feeding mechanism comprises two drive rollers arranged on both end sides of the conveyance path, and two pad rollers, each of the pad rollers being disposed to face each of the two drive rollers, and is structured to feed the card on the fourth direction side in a first state in which the conveyance path is parallel to the first direction when viewed from the third direction, in a first state, the conveyance path of the card holding part is aligned to be parallel to the first direction when viewed from the third direction, and the card drawing and feeding mechanism feeds the card on the fourth direction side, in a second state, the conveyance path of the card holding part is aligned to be inclined with respect to the first direction when viewed from the third direction and printing is performed on the card with the thermal head, in the print unit, the thermal head is structured to perform printing on the card while the card conveyance mechanism conveys the card toward the fifth direction side, a recessed part is defined in a center of an outer surface of the card holding part and surrounded by the outer surface of the card holding part, the recessed part is structured such that, when the card holding part is rotated during printing on the card, an opening of the recessed part faces the fourth direction side, and the controller controls the rotating mechanism to change the first state into the second state by rotating the card holding part when the card approaches to the card holding part and controls before the card is inserted into the card holding part so that at least a portion of the card is disposed inside the recessed part in the second state and an end of the card on the fifth direction side conveyed to the fifth direction side is prevented from being in contact with the card holding part.

2. The card processing device according to claim 1, wherein:
the card holding part is substantially rectangular in shape when viewed from the third direction;
the conveyance path is provided parallel to a longitudinal direction of the card holding part that is substantially rectangular in shape when viewed from the third direction.

3. The card processing device according to claim 2, wherein
the rotating mechanism is structured such that, during printing on the card, the rotating mechanism rotates the card holding part such that the conveyance path is inclined 90 degrees with respect to the first direction when viewed from the third direction.

4. The card processing device according to claim 1, wherein:
the card holding part is substantially rectangular in shape when viewed from the third direction;
the conveyance path is provided parallel to a longitudinal direction of the card holding part that is substantially rectangular in shape when viewed from the third direction;
when one surface in a transverse direction of the card holding part when viewed from the third direction is defined as a first transverse direction surface, the recessed part is provided in the first transverse direction surface; and
the rotating mechanism is structured to rotate the card holding part such that the first transverse direction surface faces the fourth direction side during printing on the card.

5. The card processing device according to claim 1, wherein:
when a direction orthogonal to a direction in which the conveyance path is provided when viewed from the third direction is defined as an orthogonal direction,
the drive rollers are disposed to face the conveyance path from one side in the orthogonal direction;
the pad rollers are disposed to face the conveyance path from the other side in the orthogonal direction; and
the recessed part is provided on the other side in the orthogonal direction with respect to the conveyance path.

6. The card processing device according to claim 1, wherein
the recessed part is provided between the two pad rollers in a direction in which the conveyance path is provided when viewed from the third direction.

7. The card processing device according to claim 1, wherein
the recessed part is provided between the two pad rollers in a direction in which the conveyance path is provided when viewed from the third direction.

8. The card processing device according to claim 1, further comprising:
a conveyance roller pair including a drive roller and a cleaning roller, the conveyance roller pair being provided between the thermal head and the card holding part,
wherein, a roller retraction mechanism is arranged to move the cleaning roller to a roller retracted position when the thermal head moves to a printing position.

* * * * *